July 19, 1938.  G. SPATTA  2,124,406
AXLE HOUSING AND METHOD OF FORMING SAME
Filed Sept. 9, 1935  2 Sheets—Sheet 1
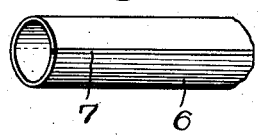
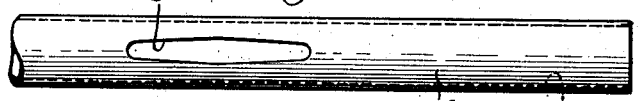
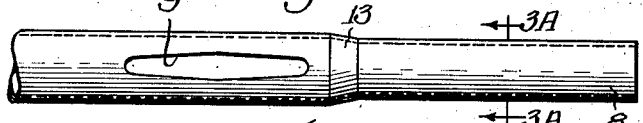
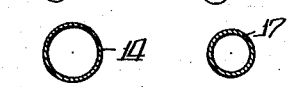
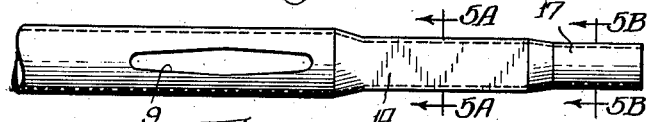
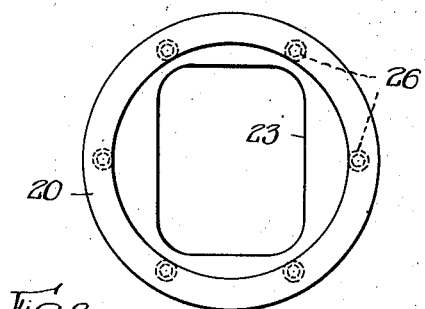
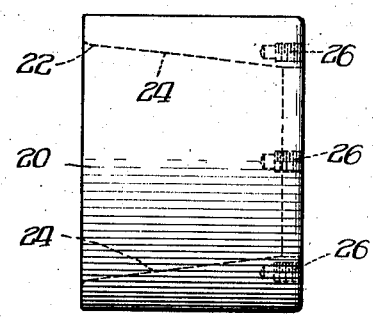
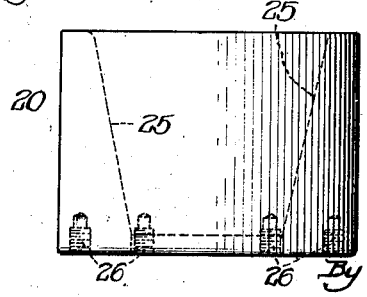
Inventor
George Spatta,
By Brown, Jackson, Boettcher & Dienner
Attys July 19, 1938.   G. SPATTA   2,124,406
AXLE HOUSING AND METHOD OF FORMING SAME
Filed Sept. 9, 1935    2 Sheets-Sheet 2
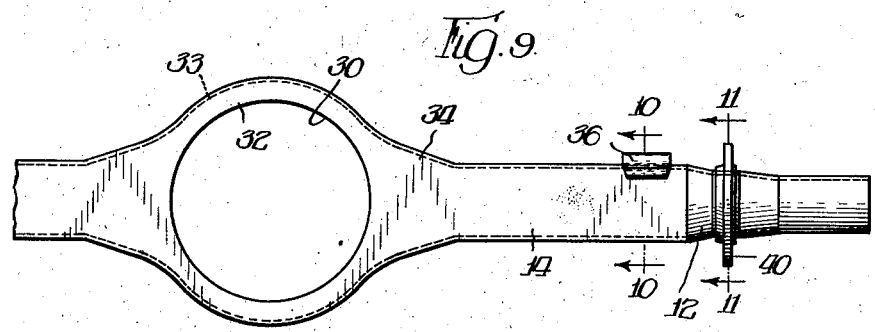
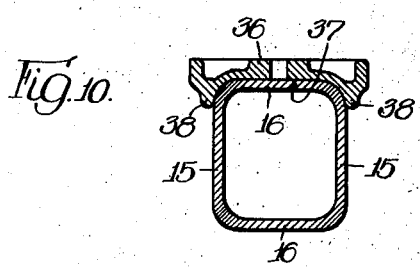
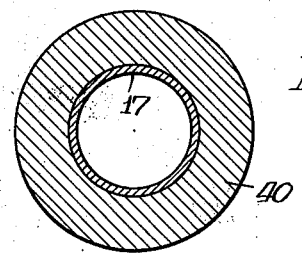
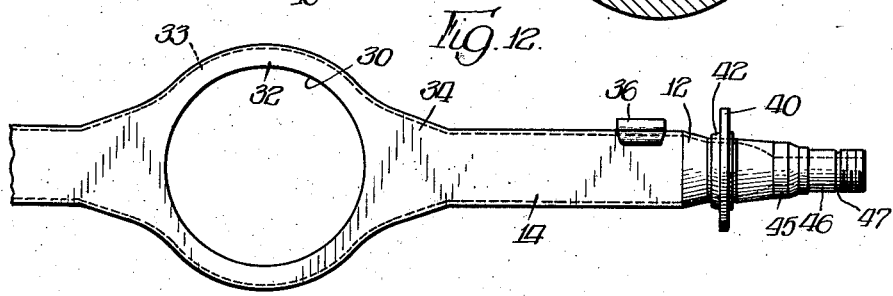
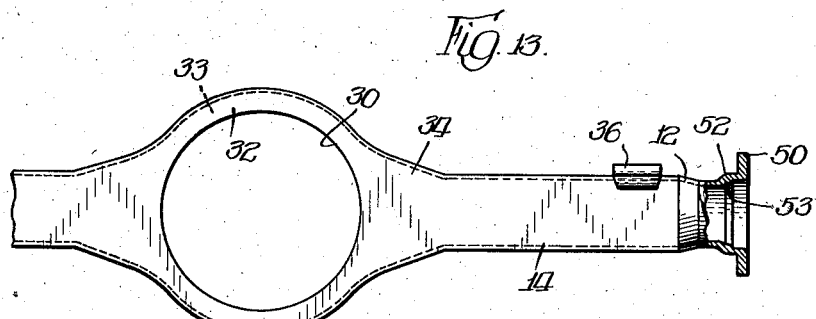
Inventor:
George Spatta,
By Barton Jackson Boettcher Dienner
attys Patented July 19, 1938

2,124,406

UNITED STATES PATENT OFFICE 2,124,406

AXLE HOUSING AND METHOD OF FORMING SAME

George Spatta, Buchanan, Mich., assignor to Clark Equipment Company, Buchanan, Mich., a corporation of Michigan Application September 9, 1935, Serial No. 39,666

15 Claims. (Cl. 29—153.1)

This invention relates to housings and the method of forming the same, and is directed more particularly to rear axle housings for trucks, busses and passenger vehicles, and to the method of forming such housings.

It has heretofore been the practice to form rear axle housings from seamless steel tubing of appropriate size and wall thickness by slotting the central part of the blank to form the banjo frame casing, and to swage and forge the ends to the desired diameter and thickness. An axle housing formed in this manner and having upset radial flanges at the end is described in detail in my Patent No. 1,926,353, issued September 12, 1933. Such housings have also been made in which the banjo portion is formed as a casting having oppositely extending sockets into which are secured suitably forged arms such as described in the Mogford and Spatta Patents Nos. 1,955,824 and 1,978,685, of April 24, 1934 and October 30, 1934, respectively.

It has always heretofore been the practice, however, to form the extending arms of such axle housings of circular cross-section, because of the necessity of swaging such arms down to a suitable thickness and diameter in working the tubular blank. Obviously, to carry a particular loading such arms must be of a predetermined diameter and wall thickness. Thus, for trucks and busses the size of the housing is an important factor, since for some of such vehicles the tubular blank must initially be of an external diameter of the order of 6 inches in order to maintain the proper load-carrying capacity.

I have conceived of an axle housing of this type in which the load-carrying portion of the arms is so formed as to carry a greater loading with the same lateral peripheral length of arm than an arm formed as a cylindrical section, or to carry the same loading with a smaller cross-sectional area than the area of a cylindrical arm of the same wall thickness.

The present invention broadly contemplates the provision of an axle housing formed from a tubular blank and having a central banjo frame casing and outwardly extending arms which intermediate their ends are formed into rectangularly shaped sections by a swaging operation somewhat similar to the swaging operations I have heretofore employed in connection with reducing the diameter of the cylindrical arms of housings formed in the manner set forth in my Patent No. 1,926,353.

One object of the present invention is to provide an axle housing of the banjo type formed from a tubular blank and having the extending arms thereof swaged into rectangular form.

Another object of the present invention is to provide a housing of this type in which the arm portions are capable of sustaining greater loads than equivalent cylindrical arms of previous types of such housings.

A still further object of my invention is to provide a method of forming banjo type axle housings in which, for an equivalent size of blank, a stronger housing than heretofore possible may be obtained, or an equivalent housing can be formed from a blank of smaller size.

The present invention also includes as a feature thereof a method of forming such a housing in which the sequence of operations is peculiarly adapted to produce the strongest and most economical type of housing with the least expenditure of time and labor.

Still another feature of the present invention is the method of forming the housing so that the metal is worked in the proper direction and manner to produce the desired wall thickness and shape without introducing any deformities or weakened sections, and in which substantially no elongation occurs during the final working operations on the arms, whereby definite control of the length of the arms is attained.

Still another advantage attained by the present invention is the provision of an axle housing in which the rectangular arm portion is adapted to provide a positive flat seating surface for the attachment of spring pads or the like, whereby they may be located in proper position with a minimum of time.

In this connection it should be noted that by the provision of a rectangularly shaped arm, the side walls of the arm portion flow smoothly into the flat sides of the banjo frame casing, facilitating the formation of the throat portion joining the arms to the central banjo frame portion.

Other objects and advantages of the present invention will appear more fully from the following detailed description which, taken in conjunction with the accompanying drawings, will disclose to those skilled in the art the particular construction and formation of a preferred embodiment of the present invention.

In the drawings:

Figure 1 shows a tubular blank of circular section which is to be formed into an axle housing;

Figure 1A is a similar view of an optional form of blank;

Figure 2 shows the blank of Figure 1 after the first slotting operation;

Figure 3 is an enlarged elevational view of one end of the blank after the first swaging operation;

Figure 3A is a sectional view through the arm, taken on line 3A—3A of Figure 3;

Figure 4 is an elevational view of the arm shown in Figure 3 after the next swaging operation;

Figure 4A is a sectional view taken on line 4A—4A of Figure 4;

Figure 4B is a sectional view taken substantially on line 4B—4B of Figure 4;

Figure 5 is an elevational view of the arm after the next swaging operation on the intermediate portion of the arm;

Figure 5A is a sectional view taken substantially on line 5A—5A of Figure 5;

Figure 5B is a sectional view taken substantially on line 5B—5B of Figure 5;

Figure 6 is an end elevational view of the die used in the operation shown in Figure 5;

Figure 7 is a side view of the die shown in Figure 6;

Figure 8 is a plan view of the die shown in Figure 6;

Figure 9 is an elevational view of a portion of the housing after the banjo frame casing has been formed and the spring pads and brake plates have been mounted in position, and prior to heat treatment of the housing;

Figure 10 is a sectional view taken substantially on line 10—10 of Figure 9;

Figure 11 is a sectional view taken substantially on line 11—11 of Figure 9;

Figure 12 is an elevational view of the completed housing; and

Figure 13 is an elevational view of a housing formed similarly to that shown in Figure 5, in which the end of the arm is upset to form a radial flange.

Referring now in detail to the drawings in Figure 1, I have disclosed a tubular blank 5 preferably formed from seamless tubing and of a length determined by the spacing required between the wheels of the vehicle in which it is to be employed. The blank 5 is of cylindrical section and of a predetermined wall thickness sufficient to provide the desired amount of metal required in forming the housing to final shape.

In Figure 1A I disclose a modified type of blank 6 which may be formed from a piece of flat steel plate, such as boiler plate for example, which is blanked to shape and formed as a cylinder by a series of forming operations prior to the formation of the housing itself. When a blank such as the blank 6 is made from a sheet of boiler plate or the like, the longitudinal edges of that sheet are beveled so that when abutted in the seam of the cylinder they form a V-shaped groove which may be closed by the metal used in welding the abutting edges together, as indicated at 7. The particular method of forming the blank 6 may follow that described in detail in the Mogford and Spatta Patent No. 1,978,685 of October 30, 1934.

Either of the blanks 5 or 6 may then be optionally employed in the formation of the axle housing, although if the blank 6 is used, the welded seam 7 should preferably be disposed at the upper part of the blank prior to the subsequent forming operations.

In Figure 2 I have disclosed the first step in the formation of an axle housing in which the blank 8 is provided with diametrically opposed slots 9 at the center portion thereof, the blank 8 being of a wall thickness as indicated by the dotted line 10. The slots 9 may be formed in any suitable manner, but preferably I employ the method set forth in my Patent No. 1,895,589 of January 31, 1933. The formation of these slots provides a suitable centering and holding means for maintaining the blank in proper position during the subsequent forming operations.

The next step in the formation of the housing consists in swaging of the extending tubular arms of the blank to the form shown in Figures 3 and 3A. This swaging operation reduces the external diameter of the arms and at the same time provides for longitudinal elongation thereof. A slight thickening of the arms is also produced by this swaging operation. The particular machine which I preferably employ for this purpose is disclosed in my Patent No. 1,962,944 of June 12, 1934.

After the two opposed arms have thus been swaged to a smaller external diameter, which may be accomplished in one or more operations depending upon the reduction in diameter required, the extremities of each of the arms are further swaged as shown in Figure 4. This operation may be produced by swaging dies similar to those employed for the operations shown in Figure 3. The dies, however, have only a limited axial movement to produce the reduced end portions joined to the arm by a frusto-conical section 12, while the intermediate portion of each of the arms is joined to the center slotted portion of the blank by corresponding frusto-conical sections 13.

In order to form the intermediate portions 14 of the arm to a rectangular section, I provide for further swaging of these portions as shown in Figures 5 and 5A, by the use of a die shown in detail in Figures 6, 7 and 8, which die may be incorporated with the dies carried in the swaging machine that performs the operations disclosed in Figures 3 and 4. The arm section 14 shown in Figure 5 is formed to a rectangular section having opposed side walls 15 and top and bottom walls 16, the rectangle being formed with its major axis extending vertically of the blank. If a welded blank, such as the blank 6 of Figure 1A, is employed, the welded seam will be disposed substantially centrally of the top wall 16 of the arm during this swaging operation.

I have found that it is desirable that the extremities of the arms be swaged to a smaller cylindrical diameter as indicated at 17, prior to the swaging operation which forms the intermediate arm portion 14 from a cylindrical section to the rectangular section shown in Figure 5A. If this step of further reducing the ends 17 is not performed previous to the rectangular swaging operation, I find that it is difficult, if not impossible, to form the cylindrically extending thickened and reduced ends subsequent to the formation of the rectangular section of the arm 14. Also, I have found that a certain critical relationship is necessary between the diameters of the cylindrical arm portion 14 and the end portion 17, and that the angularity of the section 12 must be maintained within a certain range in order to provide the proper working of the metal.

Considering now in detail the die employed for converting the cylindrical section into the rectangular section, this die is preferably formed from a cylindrical block indicated generally at 20 in Figure 6, which block at its face portion is provided with a substantially cylindrical opening 22 having outwardly flared defining edges, whereby it has smooth engagement with the external surface of the arm. The die 20 is provided with a recessed die portion as shown more in detail in Figures 7 and 8 whereby the cylindrical opening at the flared face of the die gradually merges into the rectangular opening 23 at the rear face of the die. In order to produce the rectangular shape, the top and bottom portions of the die opening are formed with a gradually increasing tapered surface as shown by the dotted lines 24 in Figure 7, which surface engages the top and bottom surfaces of the blank for moving the metal inwardly thereof to form the top and bottom walls 16 of the rectangular section. At the same time the opposed lateral side walls of the die opening are provided with a tapered surface 25 for engaging and moving the lateral portions of the cylindrical arm inwardly to form the vertically extending side walls 15 of the rectangular section. It will be noted that the angularity of the surface 25 is greater than that of the surface 24 in order to produce the vertically extending rectangular section desired. It will be apparent, however, that the surfaces 24 and 25 blend into each other in such manner as to provide for smooth working of the metal inwardly from the cylindrical surface of the blank engaged by the face 22 of the die to the rectangular section without producing overstressing of the metal at any portion of the section.

As shown by the section lines in Figure 5A, the metal adjacent the corners of the rectangular section of the arm is worked to a greater extent and is thus strain hardened, the particles being compacted and pressed together to produce a denser section at these points. This is desirable in order to produce the desired strength at the corners of the arm sections to reinforce these sections. At the same time, the working of the metal in this direction prevents elongation of the arms during this operation, and thus the desired length of arm can be accurately maintained during this final swaging operation on this section of the arm.

The die 20 is secured in a suitable die holder by means of a plurality of countersunk tapped openings 26 extending inwardly about the periphery of the rear surface of the die block, whereby the die may be carried in the die holder for reciprocating movement in a suitable crosshead carried by the working pistons of a swaging machine, such as described in detail in my Patent No. 1,962,944.

I have found that the rectangular section formed in the intermediate portion of the oppositely extending arms of the housing produces a material increase in the strength of these arms, while the wall thickness of the section remains substantially the same. For example, I have found that a rectangular section having a vertical dimension substantially equal to the diameter of cylindrical section of the same wall thickness has a ratio of strength with respect to the cylindrical section of approximately 5 to 3. It will thus be apparent that an axle housing having rectangularly shaped arms will have much greater load carrying capacity than with cylindrical arms of equivalent size. Or, viewed from another angle, the housing with rectangularly shaped arms can be made smaller in dimension and still retain the same load-carrying capacity of a larger sized housing having the cylindrical arms.

In Figure 9 I have disclosed the formation of the banjo portion of the housing in which the slotted openings 9 are expanded outwardly to define the central banjo opening 30 extending crosswise of the blank, and carrying inwardly extending parallel flange portions 32 to which the housing for the torque tube and the differential mechanism may be bolted. The flange 32 may be reinforced as desired by arcuate straps 33 which may be welded or otherwise suitably secured on the inner surface of the flanges 32. This expanded central banjo portion of the housing is joined to the arms 14 by means of substantially frusto-conical throat sections 34 providing a symmetrical junction between the banjo and the arms to produce the desired smooth external appearance. The formation of the banjo casing by the expansion of the slotted portions 9 of the blank is described in detail in my Patent No. 1,958,215 of May 8, 1934, and the formation of the throat portion 34 can be carried out in accordance with the teachings of my Patent No. 1,912,600 of June 6, 1933, by slightly modifying the shape of the mandrel or die which is disposed within the throat of the banjo casing during this forming operation.

Near the extremities of the rectangular portions 14 of the arms of the housing I provide suitable spring pads 36 having a substantially flat under surface 37 resting on the top wall 16 of the arms, and provided with depending lip portions 38 engaged over the rounded corners joining the side walls 15 of the arm to the top wall 16 thereof. The pad 36 may be secured in fixed position on the arms by welding, riveting, or in any other suitable manner.

In order to maintain the top wall 16 in a horizontal plane with respect to the banjo flange casing, I preferably provide suitable alignment means engaging in the slots 9 of the central portion of the blank for holding the blank in predetermined fixed position with respect to the die 20 during the swaging operation shown in Figure 5. In this manner I am able to provide for the side walls 15 of the arm section 14 extending substantially in planes parallel to the planes of the flanges 32 defining the banjo opening 30. This results in positioning the walls 16 of the arm section 14 in parallel planes extending substantially normal to the plane of the banjo opening, or providing for horizontal position of the walls 16 when the housing is mounted in position. This results in maintaining the spring pads 36 in horizontal extending position when they are secured to the arms of the housing.

At the end of the arm indicated at 17 and closely adjacent the frusto-conical section 12, I provide suitable annular brake plates 40 comprising a sleeve portion 42 engaging a substantially cylindrical portion of this surface and a radially flanged portion which is suitably apertured about its periphery to receive means for securing the braking mechanism thereto. The flange 40 is welded or otherwise suitably secured to the end 17 of the housing part. This end 17 is suitably swaged as shown in Figure 9 to provide a thickened reinforced end section which can then be machined to provide suitable bearing seats and the like.

Preferably the swaging operations are all performed with blank cold, and by hydraulic power, although if desired, hot swaging process may be substituted within the teachings of my invention.

After the housing shown in Figure 9 has been completed by welding of the reinforcing straps 33 to the flanges of the banjo frame casing and assembly of the spring pads 36 and brake plates 40 thereto, the entire housing is heat treated. In this heat treatment the entire housing is heated to a proper temperature, such as 1525° to 1575° F., and is then quenched in water or the like for tempering the housing. The heat treating step is followed up by a reheating up to any desired temperature. In a preferred embodiment of this invention this temperature reaches 950° F., which removes all imperfections caused by the preceding welding operations for securing the reinforcing plates, spring pads, and brake plates to the housing.

This heat treatment is of extreme importance as it provides for strengthening of the housing to an extent not hitherto obtainable, without in any way requiring increasing the wall thickness of any portion of the housing. The heat treatment further is preferably performed before the final machining and finishing operations on the housing so that any warping or twisting of the housing during the heat treating will not result in the distortion of the bearing surfaces or the like. It is desirable to perform the heat treatment previous to final machining of the bearing surfaces and after the welding operations previously described in order that the defects produced by the welding will be eliminated and the metal in the housing brought to a substantially homogeneous state before any of the machine operations are initiated.

The heat treated housing is then placed in a suitable lathe or the like and the bearing seats indicated at 45 and 46 are machined in the outer surface of the portion 17 of each of the arms. Suitable oil retainer surfaces and the like, as indicated at 47, are also formed during this machining operation.

Thus in Figure 12 I have disclosed the finished housing which has the intermediate portions of the arms formed of rectangular section and which has been heat treated prior to final machining and finishing of the housing. Obviously, other types of machine surfaces can be formed at the end portion 17 of the housing and any desired type of spring pad or brake plate can be mounted on the arms without departing from the teachings of the present invention.

While housings for use in motor busses and motor trucks must be of considerable strength in order to sustain the loads placed thereon, and consequently are formed as shown in Figure 12, my invention is not limited to the construction of such housing alone as I may also form passenger car housings in substantially the same manner.

Thus in order to make a passenger car housing I may employ a blank similar to the blank 8 shown in Figure 2, but which is of smaller initial diameter, and by the various swaging operations previously described I may bring this blank to the form shown in Figure 5. After the blank has been shaped to provide rectangular intermediate arm portions the outer ends 17 of the blank are preferably heated to a forging heat and are then upset in a series of operations by endwise punching to move metal inwardly to form an annular flange such as the flange 50 shown in Figure 13.

The details of the upsetting operations for forming the end of the housing into a section having a thickened shoulder portion 52 providing a reinforcing bearing seat 53 and having a radial flange 50 for securing breaking means thereto are disclosed in more detail in my copending application, Serial No. 534,747, filed May 4, 1931 now Patent No. 2,053,975, issued September 8, 1936.

After these upsetting operations have produced the flange shown in Figure 13, suitable spring pads may be secured adjacent the outer end of the intermediate rectangular shaped portions of the arms, and the entire housing is heat treated in substantially the same manner previously described prior to machining of the bearing surfaces 53 and the end face of the flange 50.

It is therefore believed apparent that I have provided a novel type of axle housing having the intermediate portions of the arms, extending outwardly from the banjo flange casing, formed as rectangular sections to thereby increase to a material extent the strength of the housing and to produce stiffened arm members having a minimum deflection under load.

It is obvious that this housing may be formed either from an endless tube or a welded tube, and can be finished as a full floating or semi-floating rear axle housing.

I do not intend to be limited to the exact proportions and detailed steps of operation shown and described, inasmuch as these may be modified without departing from my invention. I therefore claim as new and desire to secure by Letters Patent the invention set forth in the appended claims.

I claim:

1. An article of manufacture comprising a one-piece rear axle housing having a central banjo frame casing provided with parallel side flanges, and oppositely extending arms shaped at their ends to form wheel bearing seats, said arms having intermediate portions of increased load bearing capacity each comprising an elongated section extending from adjacent said seats to said casing and disposed with opposite walls thereof extending in the same planes as said flanges.

2. An article of manufacture comprising a rear axle housing formed from a tubular blank and having a central banjo frame casing and integral oppositely extending tubular arms, said arms between said casing and the ends being so formed in cross section as to increase the moment of inertia about the neutral axis above that of a cylindrical section of equivalent perimeter and having thickened cylindrical end portions of substantially smaller cross sectional area and of a length substantially less than the axial extent of the formed portions thereof.

3. The method of forming a rear axle housing from a tubular blank, which comprises forming a central banjo frame casing, reducing the diameter of the tubular arms extending outwardly of said casing, swaging the extremities of said arms to a diameter substantially less than the reduced arms, swaging the arms intermediate their ends into portions of rectangular section, reswaging the extremities of said arms, securing spring pads to the intermediate portions of said arms, securing brake plates to said extremities of said arms adjacent said intermediate portions, and heat treating the entire housing prior to machining of said extremities.

4. In the method of making a rear axle housing from a tubular blank, the steps of swaging the extending arm portions thereof to form cylindrical arms, swaging the ends of said arms to form cylindrical ends joined to the intermediate portion of said arms by a frusto-conical section, reswaging said intermediate portions of said arms to rectangular form, forming a central banjo frame opening in said blank, attaching spring pads to said intermediate portions of said arms and brake plates to the cylindrical ends of said arms adjacent the inner end thereof, forming bearing seats at the ends of said arms, and heat treating the entire housing prior to final machining of said bearing seats.

5. In the method of making a rear axle housing from a tubular blank, the steps of swaging the extending arm portions thereof to form cylindrical arms, swaging the ends of said arms to form cylindrical ends joined to the intermediate portion of said arms by a frusto-conical section, reswaging said intermediate portions of said arms to rectangular form, forming a central banjo frame opening in said blank, and reswaging the ends of said arms to form thickened radial flanges thereon.

6. In the method of making a rear axle housing from a tubular blank, the steps of swaging the extending arm portions thereof to form cylindrical arms, swaging the ends of said arms to form cylindrical ends joined to the intermediate portion of said arms by a frusto-conical section, reswaging said intermediate portions of said arms to rectangular form, forming a central banjo frame opening in said blank, and reswaging the cylindrical portions of said arms to reduce the external diameter thereof and to simultaneously increase the wall thickness.

7. The method of forming a rear axle housing from a seamless tubular blank which comprises slotting said blank at the central portion thereof, reducing the oppositely extending arm portions of said blank and elongating said arm portions, again reducing the extremities of said arms to produce end sections of increased wall thickness, simultaneously further elongating said arms, swaging the portions of said arms between said end sections and said central portion to provide sections of rectangular form, and expanding the slotted portion of said housing into a banjo frame opening having the defining edges thereof extending parallel to the side walls of said rectangular intermediate arm portions.

8. In a banjo type rear axle housing formed from a tubular blank and having a central banjo frame portion with oppositely extending cylindrical arm portions of uniform external diameter, the steps of swaging the extremities of said arm portions to form cylindrical thickened bearing seat portions of reduced diameter, and, subsequently swaging the remaining intermediate portions of said arms between said extremities and said frame portion into rectangular form without material change in the perimeter thereof.

9. The method of forming a rear axle housing from a seamless tubular blank, which comprises slotting said blank at the central portion thereof, reducing the oppositely extending arm portions of said blank and elongating said arm portions, again reducing the extremities of said arms to produce end sections of increased wall thickness, simultaneously further elongating said arms, swaging the portions of said arms between said end sections and said central portion to provide sections of rectangular form without producing any further elongation of said arms, and expanding the slotted portion of said housing into a banjo frame opening having the defining edges thereof extending parallel to the side walls of said rectangular intermediate arm portions.

10. The method of forming a rear axle housing from a tubular blank which includes the steps of reducing the external diameter of the extending arm portions of said blank, reducing and increasing the wall thickness of the extremities of said arms, and swaging the intermediate portion of said arms into a form having the same wall thickness as said initially reduced arm portions and having a greater moment of inertia about the neutral axis than a cylindrical section of equivalent perimeter.

11. In the method of forming an axle housing from a tubular blank, the steps comprising reducing the arm portions of said blank in two operations to provide a cylindrical end portion merging into a larger diameter cylindrical arm portion, maintaining a predetermined ratio between the diameters of said two portions to provide a predetermined frusto-conical section therebetween, forming the intermediate portions of said arms from cylindrical section into a rectangular section by endwise swaging, and attaching spring pads to the flat top wall of said intermediate rectangularly shaped portions adjacent the outer ends thereof.

12. In the method of forming an axle housing from a tubular blank, said housing having oppositely extending tubular arms of cylindrical section, the novel procedure which consists in forming the major portions of said arms between the center of said housing and the extremities of said arms into rectangularly shaped sections having a lateral dimension in at least one direction equal to the diameter of said arms prior to said forming, and forming upset radial flanges at the extremities of said arms joined thereto by enlarged annular internal bearing seat portions and short cylindrical sections of reduced diameter.

13. As an article of manufacture, an axle housing arm formed from a tubular blank and having one end thereof reduced in diameter and thickened to form a bearing seat portion, the major portion of said arm extending inwardly from the bearing seat portion being swaged into rectangular form to increase the moment of inertia thereof without material change in wall thickness and merging into the bearing seat portion through a frusto-conical section, spring pads attached to said rectangular portion of said arm adjacent said section, and a brake plate secured to the inner end of the bearing seat portion adjacent said section.

14. As an article of manufacture, an axle housing arm having one end thereof reduced in diameter and of increased wall thickness to provide a bearing seat portion, the opposite end of said arm being flared outwardly in one plane to define a portion of a banjo frame, and the remaining intermediate portion of said arm being of rectangular section to increase the load carrying capacity thereof, and having opposed walls lying coplanar with the lateral faces of the banjo frame portion.

15. An axle housing formed from a tubular blank and having a central enlarged cylindrical banjo frame portion provided with oppositely extending arms, each of said arms being of rectangular section from said frame portion to adjacent the outer extremities thereof, and thickened wheel supporting portions at the extremities of said arms joined to the rectangular section by axially inwardly and radially outwardly flaring frusto-conical sections.

GEORGE SPATTA.